(12) United States Patent
Cristini et al.

(10) Patent No.: US 12,043,170 B2
(45) Date of Patent: Jul. 23, 2024

(54) COMPUTER-IMPLEMENTED METHOD FOR AUTOMATICALLY DEACTIVATING THE LEFT OR RIGHT TURN SIGNALS OF A VEHICLE AT THE END OF A TURN

(71) Applicant: VOLVO TRUCK CORPORATION, Gothenburg (SE)

(72) Inventors: Ugo Cristini, Port (FR); Remi Barrellon, Simandres (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 401 days.

(21) Appl. No.: 17/425,187

(22) PCT Filed: Feb. 25, 2019

(86) PCT No.: PCT/EP2019/054618
§ 371 (c)(1),
(2) Date: Jul. 22, 2021

(87) PCT Pub. No.: WO2020/173543
PCT Pub. Date: Sep. 3, 2020

(65) Prior Publication Data
US 2022/0118903 A1    Apr. 21, 2022

(51) Int. Cl.
*B60Q 1/40* (2006.01)
*B62D 15/02* (2006.01)

(52) U.S. Cl.
CPC ........... *B60Q 1/40* (2013.01); *B62D 15/0215* (2013.01)

(58) Field of Classification Search
CPC .................. B60Q 1/40; B62D 15/0215; B60K 2370/131; B60K 2370/133;
(Continued)

(56) References Cited

U.S. PATENT DOCUMENTS

| 6,876,300 B2 | 4/2005 | Ponziani |
| 9,041,526 B2 | 5/2015 | Nishimura |

(Continued)

FOREIGN PATENT DOCUMENTS

| EP | 1681203 A2 | 7/2006 |
| EP | 1068991 B1 | 5/2008 |

(Continued)

OTHER PUBLICATIONS

International Search Report and Written Opinion dated Oct. 10, 2019 in corresponding International PCT Application No. PCT/EP2019/054618, 8 pages.

*Primary Examiner* — Frederick M Brushaber
(74) *Attorney, Agent, or Firm* — Venable LLP; Jeffri A. Kaminski

(57) ABSTRACT

The invention relates to a computer-implemented method for automatically deactivating the right or left turn signals of a vehicle at the end of a turn, the method comprising steps consisting in: (a) determining, as long as the right or left turn signals are on, the steering wheel angle with respect to a neutral position in which the two steered wheels of the vehicle are straight, (b) determining (108) the average angle of the steered wheels in relation to their upright position from the steering wheel angle, (d) when the left turn signals are on, automatically deactivating (120) the left turn signals when the average wheels angle exceeds, in relative value, a first positive threshold and then, still in relative value, falls below a second positive threshold, (e) failing this, keeping (118) the left turn signals on, (f) when the right turn signals are on, automatically deactivating (120) the right turn signals when the average wheels angle (A2) falls below, in relative value, a first negative threshold (−01) and then, still in relative value, exceeds a second negative threshold, (g) failing this, keeping (118) the right turn signals on.

18 Claims, 4 Drawing Sheets

(58) Field of Classification Search
CPC ........ B60K 2370/168; B60K 2370/193; B60K 2370/782; B60K 2370/797; B60K 37/06; B60K 35/00
See application file for complete search history.

(56) References Cited

U.S. PATENT DOCUMENTS

| | | | |
|---|---|---|---|
| 9,731,648 B2* | 8/2017 | Liotti | B60Q 1/40 |
| 2010/0156621 A1* | 6/2010 | Nishimura | B60Q 1/42 |
| | | | 340/476 |
| 2019/0047469 A1* | 2/2019 | Nishiguchi | B60Q 1/40 |
| 2020/0369205 A1* | 11/2020 | Nakai | B60K 35/00 |
| 2021/0403088 A1* | 12/2021 | Eckstein | B60K 35/00 |

FOREIGN PATENT DOCUMENTS

| | | | | |
|---|---|---|---|---|
| EP | 3010758 A1 * | 4/2016 | | |
| EP | 3010758 A1 | 4/2016 | | |
| FR | 2967376 A1 | 5/2012 | | |
| GB | 2451085 A * | 1/2009 | ............ | B60Q 1/305 |
| JP | 4473186 B2 | 6/2010 | | |

\* cited by examiner

COMPUTER-IMPLEMENTED METHOD FOR AUTOMATICALLY DEACTIVATING THE LEFT OR RIGHT TURN SIGNALS OF A VEHICLE AT THE END OF A TURN

CROSS-REFERENCE TO RELATED APPLICATIONS

This application is a U.S. National Stage application of PCT/EP2019/054618, filed Feb. 25, 2019, and published on Sep. 3, 2020, as WO 2020/173543 A1, all of which is hereby incorporated by reference in its entirety.

TECHNICAL FIELD

The invention concerns a computer-implemented method to automatically deactivate the left or right turn signals of a vehicle at the end of a turn.

The invention can be applied in heavy-duty vehicles, such as trucks and buses. Although the invention will be described with respect to a truck, the invention is not restricted to this particular vehicle, but may also be used in other vehicles such as buses.

BACKGROUND

In the automotive sector, the turn signals, also known as "direction change lamps", "flashing lights", "turn indicators" or "direction indicators", are headlights that emit a discontinuous light, which is selectively activated to indicate the driver's intention to turn right or left. The turn signals are usually provided at the front and rear of the vehicle, and possibly also on the sides.

The turn signals draw the attention of the other road users to the driver's intention to turn right or left. The indicator control system most often includes a lever, or "stalk" located near the steering wheel. By manually rotating the lever up or down from a neutral position, the driver selectively activates the turn signals on the right or left side of the vehicle to indicate his intention to turn right or left, respectively.

For many years, and in order to simplify the driver's tasks, indicator control systems have also included a mechanism that combines the stalk and the steering wheel: When the steering wheel returns to or almost to its neutral position, i.e. when the vehicle has made its change of direction, the stalk itself is automatically returned by this mechanism to its neutral position, and the return of the stalk to the neutral position is then accompanied by the automatic deactivation of the turn signals. This mechanical solution has several disadvantages.

Firstly, it involves a relatively complex mechanism, which is a source of noise and is also subject to wear and tear, with the risk of deterioration in operation over time.

Secondly, this solution is conditional on the steering wheel passing through its neutral position, so that the mechanical action of stopping the turn signals occurs. However, in a roundabout, and in the event that the driver wishes to go straight ahead or turn left, he will have to activate his left turn signal, but first turn right. At the end of the right turn, the steering wheel temporarily returns to the neutral position and therefore the previously activated turn signals will stop prematurely. This requires the driver to manually hold the stalk down or lower the stalk again to repeat the request to activate the left turn signals. This can obviously be dangerous because the driver can divert his attention from traffic. Also, this mechanical system, with its associated slamming noises, damages the vehicle's brand image and gives a low-end vehicle feel.

To overcome these disadvantages, FR 2 967 376 A1 teaches to control the automatic deactivation of turn signals in a purely electronic way, based on the measurement of the rotation of the steering wheel angle. Typically, in this document, a processing unit continuously receives and analyses the steering wheel rotation angle. If this angle reaches or exceeds a threshold value and the steering wheel has returned to a reference position, such as a neutral or close position, the processing unit considers that the vehicle has completed its change of direction and the turn signals are off. Conversely, as long as the steering wheel rotation angle is less than the said threshold value or the steering wheel has not returned to the neutral position, it is considered that the vehicle has not made its change of direction and therefore the turn signals remain on.

U.S. Pat. No. 9,041,526 B2 also discloses a method in which the steering wheel angle is used to automatically stop the turn signals at the end of a turn. Specifically, it is first checked that the driver has properly initiated his turn by checking that the steering wheel has been sufficiently moved away from its neutral position and that the steering angle has dropped below a certain threshold, proof that the steering wheel has returned or will return to its neutral position. If these two conditions are met, the turn signals or turn indicators are automatically deactivated.

U.S. Pat. No. 6,876,300 B2 also includes an intelligent turn signals control system, in which the speed of the left and right wheels, and in particular the speed differential between the right and left wheels, is used to determine when the vehicle turns and in which direction it turns. The right or left turn signals are then automatically activated and deactivated accordingly.

EP 1 068 991 B1 discloses a steering column module for motor vehicles, including a first switch for controlling turn signals. This first switch is equipped with an automatic turn signals deactivation device that can be controlled by a steering angle sensor. This angle sensor is positioned in the axis of the steering column so that the measured angle is the steering wheel angle.

EP 1 681 203 also concerns a method of automatically deactivating vehicle's turn signals at the end of a turn. The originality of this document is to use the engine data from the electric power steering system to evaluate the steering wheel position, and therefore the steering wheel steering angle, to automatically stop the turn signals at the end of the turn.

The problem with these methods is that they do not take into account the characteristics of the vehicle, and in particular the characteristics that influence the steering system. These include the height of the chassis, the wheelbase, the possible presence of a third axle, the characteristics of the gearbox, etc. As a result, these methods are not very precise (or effective) in certain situations, such as when forking or overtaking. Typically, in this type of situation, the angle of the turn is not high enough for the driver to turn the steering wheel beyond the threshold required to automatically turn off the turn signals. Thus, it happens that the turn signals remain on even when the vehicle returns to the upright position and therefore the driver has to deactivate them manually.

SUMMARY

It is to these disadvantages that the invention aims more particularly to remedy by proposing a more efficient method, i.e. with a lower failure rate. By failure, we mean that the right or left turn signals do not go off, too late or too early (untimely).

With this respect the invention concerns a computer-implemented method according to claim 1.

Using the actual angle of the wheels in relation to their upright position (average wheels angle), rather than the steering wheel angle, in the automatic deactivation system algorithm, makes the system much more accurate because it takes into account the specificities of each vehicle, and in particular those that affect steering. Indeed, for a given steering wheel angle, the angular position of the wheels (with respect to their straight position) may be different according to the type of vehicle. Taking this difference into account, the algorithm is improved and the cases where the right or left turn signals automatically switch off before the end of the turn or, on the contrary, too long after the end of the turn are limited.

Further advantages and advantageous features of the invention are disclosed in the following description and in the dependent claims 2 to 11.

The invention also concerns a computer program according to claim 12.

The invention also concerns a control unit according to claim 13.

The invention also concerns a vehicle according to any one of the claims 14 to 18.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENT(S) OF THE INVENTION

Figure 1:
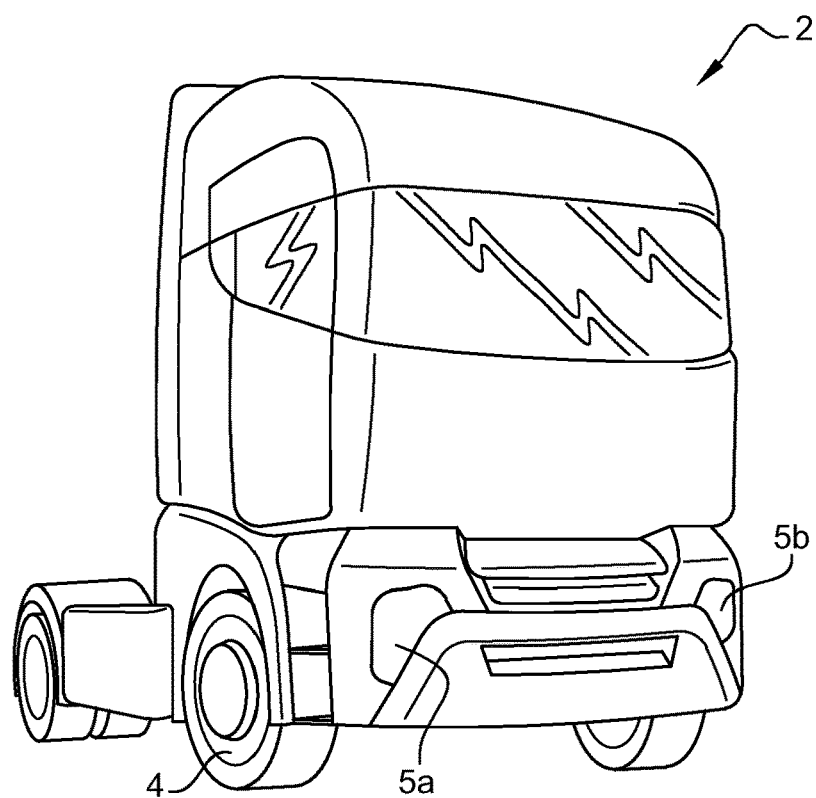
FIG. 1 is a perspective view of a vehicle, in particular a truck, comprising a control unit capable of implementing the method of the invention.

FIG. 1 shows a vehicle 2, in particular a truck, with at least four wheels, including two steering wheels 4. The two steering wheels 4 are the front wheels. They are able to rotate around a vertical axis, therefore perpendicular to the surface of the ground, when the vehicle is in a bend, i.e. turns.

Vehicle 2 has right and left turn signals. The right and left turn signals include each at least two light devices, positioned respectively at the front and rear of the vehicle, to alert users in front of or behind the vehicle of a future change of direction. FIG. 1 shows only two light devices, in particular the light devices 5a and 5b located at the front of the vehicle.

Figure 2:
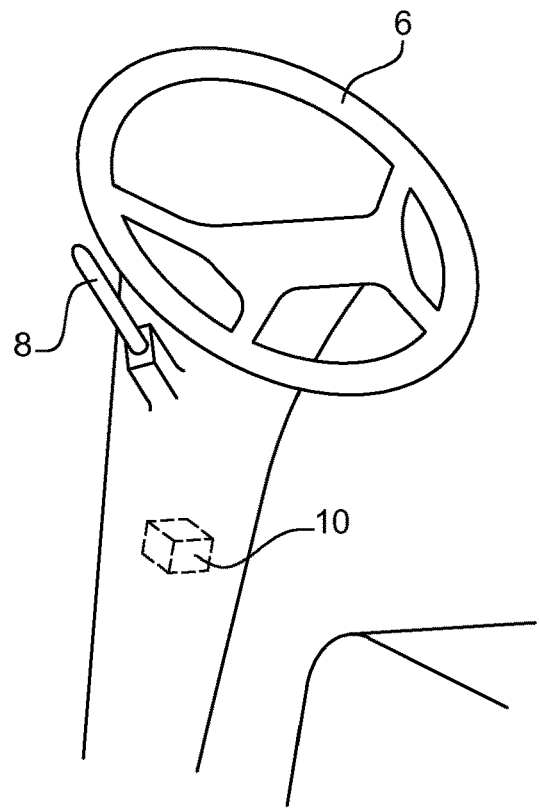
FIG. 2 is a perspective view of the interior of the cabin, showing the steering wheel and the device for controlling the turn signals of the vehicle.
Figure 3:
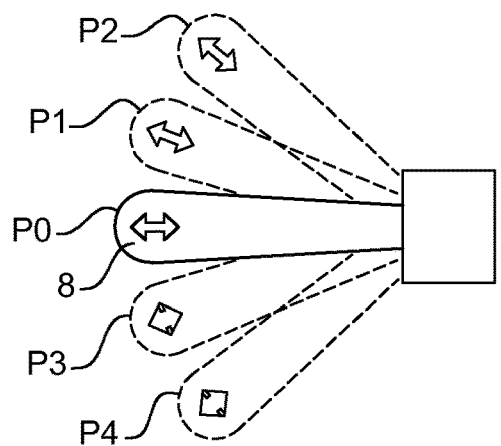
FIG. 3 represents all of the possible positions in which the device can be brought into.

As shown in FIG. 2, Vehicle 2 includes a device 8 for manually controlling the vehicle's turn signals. Preferably, this device 8 is movable at least in two directions, respectively to indicate a right or left turn, and is recalled to a neutral position P0 when released by the driver.

Advantageously, device 8 is a pivoting lever, commonly known as a "stalk". In a manner known per se, the driver moves the device 8 up when he wishes to turn right and moves the device 8 down when he wishes to turn left. However, it is obvious that any other control device can be used instead of a stalk.

In the example, device 8 is positioned near the steering wheel 6, especially on the driver's left when the driver is seated in the driving position.

According to a preferred mode of execution, the vehicle's right or left turn signals are activated differently depending on the length of the travel performed by the control device in either direction from the neutral position. This means that for each direction of movement there are at least two separate control positions, respectively P1 and P2 or P3 and P4, i.e. at least four positions in total in addition to the neutral position P0.

The neutral position P0 is referred to as "stable" because it is a position in which device 8 is by default, in the absence of any action by the driver. On the other hand, all other positions P1 to P4 are referred to as "unstable" positions since device 8 cannot remain locked (alone) in any of these positions. This type of actuation mode is well known from US publication 9 041 526 B2, so it is not described further.

Preferably, the turn signals are temporarily activated when device 8 is moved to a first position P1 or P3, also called "highway positions", and therefore automatically switch off after a certain period of time, for example about 3 seconds, has elapsed since the time when device 8 reached the first position P1 or P3.

Also, the turn signals are advantageously activated permanently when the device 8 is moved to a second position P2 or P4 that is further away from the neutral position P0 than the first position, respectively P1 or P3. Thus, in the embodiment of the figures, in which device 8 is a stalk, the angle of movement required to move the lever between the neutral position P0 and the second position P2 or P4 is greater than that required to move the lever between the neutral position P0 and the first position P1 or P3.

The following is a first (manual) way to use the control device 8.

When the driver moves the device 8 from its neutral position P0 to the first right or left position, respectively P1 or P3, the right or left turn signals are activated temporarily only. For example, the corresponding light devices emit 2 or 3 flashes. This is particularly suitable for driving on highways, where changes of direction are generally very short.

Advantageously, if the driver keeps the device 8 in its first position P1 or P3, i.e. if he does not let the device 8 return to its neutral position, then the right or left turn signals remain activated until the device 8 returns to its neutral position P0.

When the driver moves the device 8 from its neutral position P0 to the second right or left position, respectively P2 or P4, the turn signals are activated for a long time, and continues to flash until the driver decides to deactivate it by performing an additional operation. Also, and in case the driver has released the control device 8, the turn signals can be automatically disabled by an automatic disabling algorithm, which is described later in the description. Indeed, if the driver maintains the control device 8 in position P2 or P4, the automatic disabling algorithm is not implemented. Finally, the turn signals automatically switch off when the driver switches off the ignition, i.e. turns off the engine.

In the example, after device 8 has been moved to one of the two positions P2 and P4 (right or left), the driver can deactivate the turn signals that operate continuously, by moving device 8 to or beyond the 1st unstable position (P3 or P1 respectively) in the opposite direction of the activated turn signals. Typically, if the left turn signals have been activated and flash continuously, then the driver will have to switch the device 8 to the right side, i.e. as if to turn right, in order to deactivate the right turn signals, and vice versa for the right turn signals.

Also, when the driver has activated the turn signals (right or left) in the permanent mode and the driver has then moved the device 8 in the other direction (left or right respectively) to activate the opposite turn signals, also in the permanent mode (second position), then it is considered that the driver wishes to indicate a change of direction. The turn signals (right or left) activated first are then deactivated and the turn signals (left or right respectively) activated in second place start to flash permanently.

A second (manual) way of using the indicator control device 8 is described below.

This second way is essentially identical to the first way, except when the driver has activated the turn signals (right or left) once in the permanent mode and operate the device 8 to activate the other turn signals (left or right respectively) in the permanent activation mode. In this case, the period during which the driver holds the device 8 in position P2 or P4 is measured. If this period is short, i.e. below a certain threshold, then the turn signals (or indicators) activated first (right or left) is only disabled and the reverse turn signals (left or right respectively) are not activated. On the other hand, if this period is relatively long, i.e. above a certain threshold, then the indicator activated first (right or left) is disabled and the reverse indicator (left or right respectively) is activated, in its permanent flashing mode.

Typically, the threshold considered is in the order of 300 ms. This threshold value is particularly suitable for trucks and other heavy-duty vehicles, such as buses. Below 300 ms, there is a risk that the turn signals will activate without the driver having any real intention of activating them.

As mentioned above, vehicle 2 includes a system to automatically deactivate the vehicle's turn signals, or direction indicators, at the end of a turn. In the example, this system includes an Electronic Control Unit (or ECU) that is not represented on the figures and a rotation sensor 10 to measure the rotation of the steering wheel 6, and in particular the angle of the steering wheel 6 with respect to a neutral position in which the vehicle wheels are straight.

In this document, and unless otherwise indicated, all the angles referred to are relative angles, which can therefore be positive or negative depending on the direction of rotation. Typically, when talking about the steering wheel angle in relation to the neutral position (wheels straight), the angle will be positive when turning the steering wheel to the left and negative when turning the steering wheel to the right (polar coordinates). The same applies to the average angle of the vehicle's front wheels: When turning left, the angle of rotation of the wheels is considered positive, while when turning right, it will be negative.

This ECU is dedicated to controlling the activation and deactivation of the turn signals according to the driver's manoeuvres on the control device 8 and the vehicle's driving conditions, using an algorithm detailed later in the description, which uses data from the various vehicle sensors as well as time data.

As mentioned above, vehicle 2 advantageously includes a Steering Angle Sensor (SAS) to measure the degree of rotation of the steering wheel 6 in relation to a neutral position. Of course, any other sensor or method can be used to determine the degree of rotation of the steering wheel in radiant/degrees. Typically, steering wheel angle information can be accessed from the power steering system data.

The steps of the algorithm (or computer-implemented method) used to automatically disable the vehicle's turn signals at the end of a turn are described below, in conjunction with FIG. 6. With this respect, the letter "Y" (for Yes) means that the condition of the corresponding step is met, while the letter "N" (for No) means that such condition is not met.

At step 100, the driver is considered to manually activate one of the two turn signals (or indicators) using the control device 8 to signal to other road users that he wishes to turn.

In step 102, the turn signals (left or right) selected by the driver are physically activated: the vehicle's lighting devices emit a flashing signal on the corresponding right or left side. In the case where the turn signals control device 8 allows two operating modes, namely a temporary mode and a permanent mode, it is assumed that the driver has activated the permanent mode, i.e. in which the turn signals do not automatically switch off after a certain period of time. At this point, the control device 8 sends the above-mentioned ECU the information that the driver has activated the right or left turn signals, or indicators, and in particular which turn signals have been activated (right or left)

In step 104, it is checked whether the driver has operated the control device 8 in such a way as to request that the turn signals be deactivated, i.e. whether the driver has, on his own, requested that the turn signals (or indicators) be deactivated. If so, and as mentioned above, an optional check is carried out in step 116 to see whether the driver has maintained his request for deactivation for a certain period of time, i.e. whether the driver has maintained device 8 in position P2 or P4 for a certain period of time. If so, the turn signals are off in step 120. Otherwise, the turn signals are kept on (step 118).

If the driver has not indicated his willingness to deactivate the turn signals, then the algorithm is used to determine whether or not to deactivate the turn signals automatically, i.e. without the driver's consent.

In step 106, information about driving conditions is collected. In particular, information on the direction of travel and vehicle speed is collected. Based on this information, the system automatically calculates two parameters, respectively θ1 and δ, the function of which will be detailed below.

In a later step 108, the average wheels angle A2 is determined from the value of the steering wheel angle A1. The steering wheel angle A1 is measured continuously after the vehicle driver has manually activated one of the turn signals (left or right) by acting on the control device 8. The steering wheel angle is measured with respect to a neutral position in which both steering wheels of the vehicle are straight, and as long as the right or left turn signals are activated.

Steering wheel 6 is the first element of the steering system. The steering system is a complex mechanism that is adapted to the type of vehicle. The parameters that influence the steering system are essentially as follows:

Vehicle type (Length, weight, etc.);
Engine (Dimensions);
Chassis;
Frame height;
Wheelbase;
Connection bar;
Front suspension;
Number of axles;
Directional geometry, etc.

Figure 4:
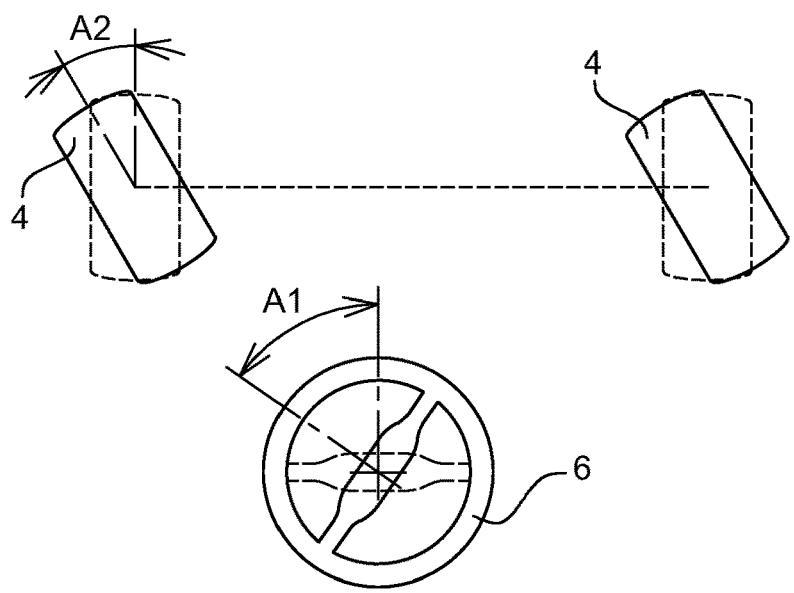
FIG. 4 is a schematic depiction showing the rotation of the steering wheel with that of the wheels of the vehicle.

As shown in FIG. 4, the relationship between steering wheel angle A1 and steering wheels angle A2 is not linear.

For the record, the steering wheels angle A2 is known as average wheel angle because there may be a slight difference between the right and left wheel angles.

Also, in step 108, the angle A2 of the vehicle's steered wheels with respect to their upright position is extrapolated from a model previously established from several wheels angle calculations for several specific steering wheel angles.

In particular, the relationship has been advantageously linearized through five wheel steering angle values for which the ratio between steering wheel steering angle A1 and average wheel angle is known.

The five known steering ratios ILr1 to ILr5 are as follows:
ILr2: Steering ratio when the average wheel angle is 0.6 rad on the right;
ILr1: Steering ratio when the average wheel angle is 0.2 rad on the right;
IL: Steering ratio when the average wheel angle is 0 rad;
ILl1: Steering ratio when the average wheel angle is 0.2 rad left;
ILl2: Steering ratio when the average wheel angle is 0.6 rad to the left.

Figure 5:
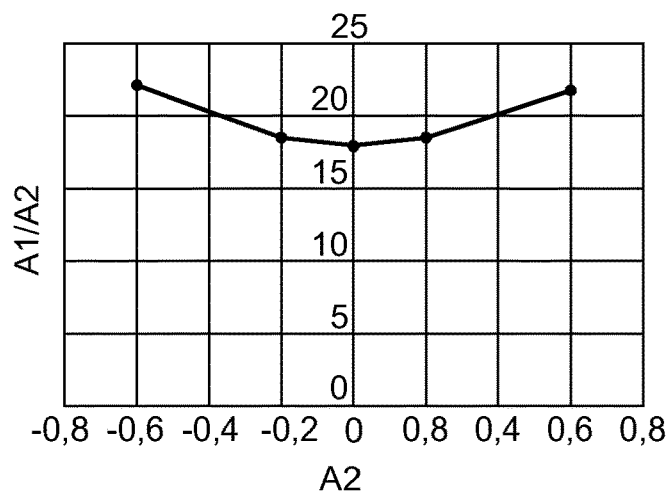
FIG. 5 is a graph showing the evolution of the ratio between the steering wheel rotation angle and the average wheels rotation angle as a function of said average wheels angle.

From these values, and as shown in FIG. 5, it is possible to estimate, for a given steering wheel angle value, the average angle of the corresponding wheels with some precision.

The model used can be constructed using the following equations, over the different wheel rotation ranges.

$$A2: [0; 0, 2 \cdot IL_{l1}] = \left(\frac{\frac{1}{IL_{l1}} - \frac{1}{IL}}{0, 2IL_{l1}}\right) \cdot A1^2 + \frac{1}{IL} \cdot A1$$

$$A2: ]0, 2 \cdot IL_{l1}; \infty[ = \left(\frac{\frac{1}{IL_{l2}} - \frac{1}{IL_{l1}}}{0, 6IL_{l2} - 0, 2IL_{l1}}\right)^2 \cdot A1^2 +$$

$$\frac{0, 6IL_{l2}^2 - 0, 2IL_{l1}^2}{IL_{l1} \cdot IL_{l2} \cdot (0, 6IL_{l2} - 0, 2 \cdot IL_{l1})} \cdot A1$$

$$A2: [-0, 2 \cdot IL_{r1}; 0] = \left(\frac{\frac{1}{IL} - \frac{1}{IL_{r1}}}{0, 2IL_{r1}}\right) \cdot A1^2 + \frac{1}{IL} \cdot A1$$

$$A2: ]-\infty; -0, 2IL_{r1}[ = \left(\frac{\frac{1}{IL_{r1}} - \frac{1}{IL_{r2}}}{0, 6IL_{r2} - 0, 2IL_{r1}}\right)^2 \cdot A1^2 +$$

$$\frac{0, 6IL_{r2}^2 - 0, 2IL_{r1}^2}{IL_{r1} \cdot IL_{r2} \cdot (0, 6IL_{r2} - 0, 2 \cdot IL_{r1})} \cdot A1$$

Advantageously, during the entire period during which the turn signals activated, the maximum angle θmax and the minimum angle Amin, in relative values, of the steered wheels with respect to their right position are stored in memory and updated in step 110, throughout the period during which the left or right turn signals are activated.

Then, and in a step 112, the average wheels angle A2 determined in step 108 is compared dynamically with the parameter θ1 calculated in step 106. This parameter θ1 can then be considered as a first threshold. The idea here is to check if the driver has really started his turn by looking at whether the driver has turned the steering wheel sufficiently in the direction of the turn. Of course, the direction of rotation of the wheels is taken into account: If the left turn signals are activated and the driver turns the steering wheel to the right, as in a roundabout for example, the condition will not be met. This condition will be considered fulfilled once the driver has started his left turn, i.e. in the direction of the turn signals. This is done by taking into account relative angle values (positive or negative).

Specifically, during a left turn, step 112 checks whether the angle A2 of the wheels exceeds (is greater than) the positive value θ1. On the other hand, during a right-turn, it is checked whether the angle of the wheels A2, in relative value, drops below (is lower than) the negative value (−θ1).

Figure 6:
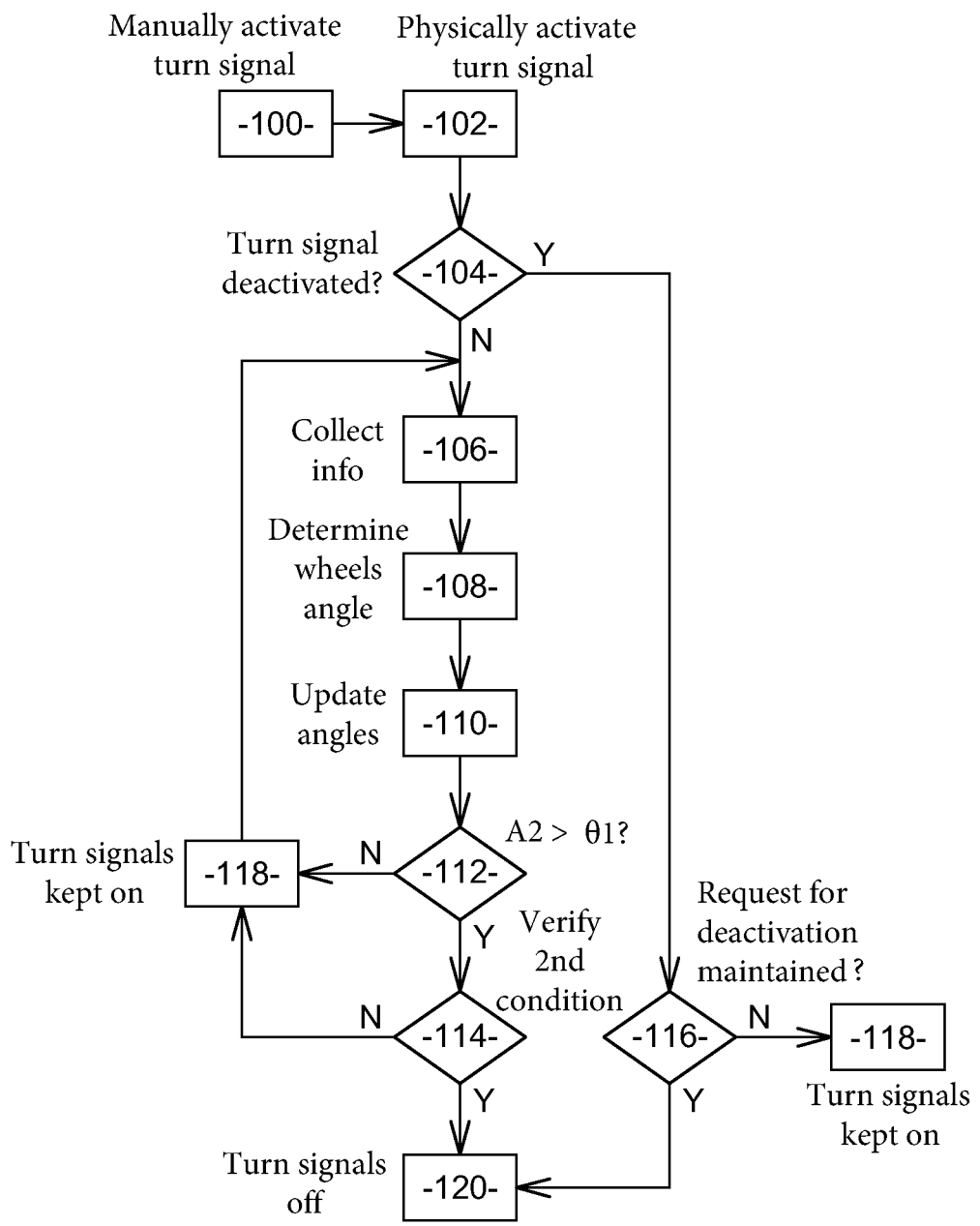
FIG. 6 is a representative diagram of the steps of the method according to the invention.

Otherwise, i.e. as long as the driver has not turned the steering wheel 6 in the direction of the indicated turn, the turn signals remain on (step 118 in FIG. 6).

On the other hand, it means that the driver has made a good start on his turn. In this case, in step 114, a second condition is verified. When the activated turn signals are the left turn signals, this second condition is to determine whether the average angle of the wheels A2, after having exceeded the threshold θ1, has fallen below a second positive threshold. When the activated turn signals are the right turn signals, this second condition is to determine whether the average angle of the wheels A2, after having dropped below the negative threshold (−θ1), has exceeded (is greater than) a second negative threshold.

In the example, the first positive threshold θ1 and the first negative threshold (−θ1) are identical in absolute value.

Advantageously, the second threshold corresponds to the parameter δ multiplied by the maximum angle θmax (positive) stored in memory when the left turn signals are activated and to the parameter δ multiplied by the minimum angle Amin (negative) stored in memory when the right turn signals are activated. The parameter δ is therefore a percentage, which is for example around 25% (or 0.25). Accordingly, during a left turn, we check in step 114 if the angle A2 of the wheels drops below (is lower than) the positive value δ*θmax. On the other hand, during a right-turn, in step 114 we check whether the angle A2 of the wheels exceeds (is greater than) the negative value (δ*θmin).

Preferably, this parameter δ automatically varies according to the speed of the vehicle. Also, this parameter δ is in the example different depending on whether the vehicle is moving forward or backward.

Alternatively, the second threshold is fixed and is preferably lower, in absolute value, than the first threshold θ1.

If both conditions are met then the turn signals are automatically disabled (step 120).

Otherwise, the turn signals are kept on (step 118).

Also, the algorithm is implemented iteratively, i.e. the routine is implemented throughout the duration of the turn signals activation.

Figure 7:
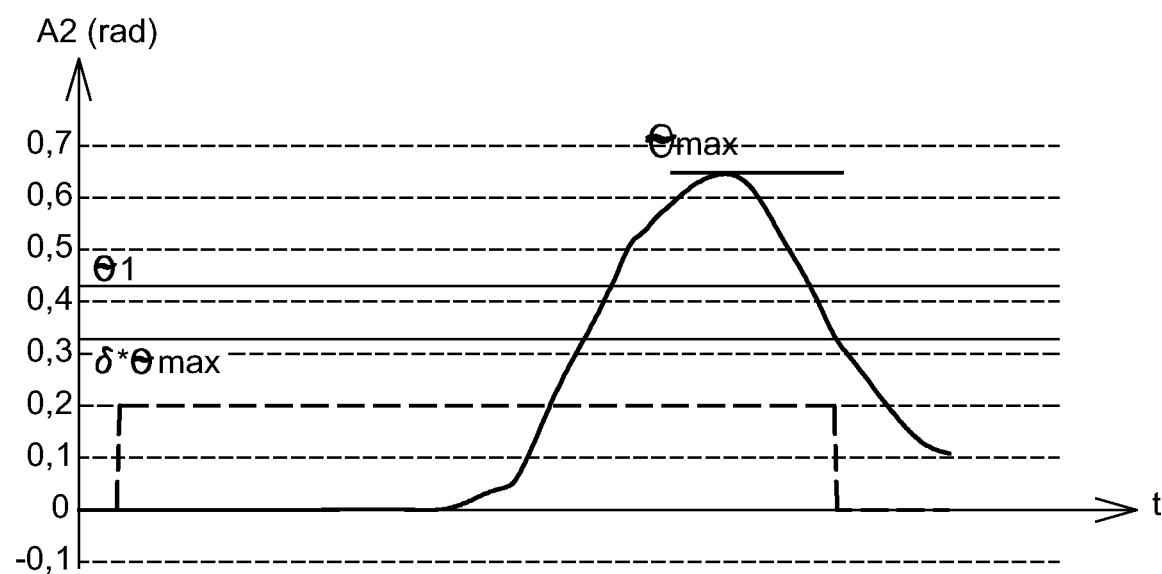
FIG. 7 is a graph representing the evolution of the average wheels angle over time during a turn, together with the period of activation of the corresponding turn signals.

FIG. 7 shows an example of how the deactivation algorithm is implemented during a left turn. The solid line curve shows the evolution of the average wheels angle A2 over time, while the dashed curve (square wave) shows the state of the turn signals (on or off). When the indicators are activated, the dashed curve changes from a first state (whose points have a zero ordinate) to a second state where the points have a non-zero ordinate, giving this rectangular signal shape. FIG. 7 shows that the driver starts activating the left turn signals. Then, during the turn, the average wheels angle A2 first exceeds the first threshold θ1, which means that the driver has started his turn, and then the angle A2 drops below a second threshold δ*θmax, proportional to the maximum value θmax of the average wheels angle A2, which means that the driver has achieved or almost achieved his turn. At this precise moment, we see that the turn signals are automatically deactivated.

In the example of FIG. 7, there is no delay between the time when the angle A2 drops to the value δ*θmax and the time when the turn signals are physically switched off. However, a slight delay can be applied, as explained below. In practice, a computer program comprising program code means for performing the steps of the method described above is stored in memory in the control unit (or ECU) for automatic deactivation of the turn signals.

Advantageously, at least the first or second threshold automatically varies according to the speed of the vehicle. Typically, at least the first or second threshold is different depending on whether the vehicle is travelling at a speed above a certain limit, for example 60 km/h, or below that limit.

Preferably, at high speed, i.e. when the speed is higher than 60 km/h, the driver should preferably use the P1 or P3 position, which is a "highway" position to indicate a lane change (highway exit for example). In this case, the turn signals automatically turn off after 3 seconds. The use of these "highway positions" P1 and P3 means that the intelligent automatic cancellation system is not necessary at high speed.

Also, still at high speed (speed above 60 km/h), the automatic deactivation system can collect information from the line maintenance assistance system if the vehicle is equipped with it. Typically, the line detection system sends information to the Automatic Cancellation System (ACS) controlling the turn signals when the vehicle has crossed a line. The system will then be able to deactivate the turn signals, after an action on the steering wheel has been detected, when the vehicle has crossed the line.

The values of θ1 and δ were established with data recorded on trucks and with field tests with real trucks. The main objective was to have an intelligent Automatic Cancellation System that does not disable the turn signals in undesirable situations. θ1 and δ are designed to offer the best accuracy, or efficiency.

For example, the maximum speed of trucks in roundabouts is 35 km/h and the θ1 is in the order of 0.15 rad because it is the low value that can ensure that the turn signals (or direction indicators) will not turn off in roundabouts.

Also, at least the first or second threshold is different depending on whether the vehicle is moving forward or backward. In reverse, the speed sensor cannot be used, or at least not effectively for negative values. Thus, when the reverse gear is activated, the algorithm calculates/fixes new values for this use (θ1 and δ) and is ready to work under the same conditions as described above for a low speed situation, ensuring intelligent automatic cancellation of the turn signals.

Advantageously, the turn signals are physically switched off at a later time than when it was decided to switch them off. In other words, the turn signals remain on for a certain period of time, for example about one second, after both conditions for automatic deactivation have been met. This delay (whose value is based on experience and driver feedback) ensures that the turn signals will turn off at the end of the turn and not during the turn. Of course, a more or less important delay can be applied if necessary.

It is to be understood that the present invention is not limited to the embodiments described above and illustrated in the drawings; rather, the skilled person will recognize that many changes and modifications may be made within the scope of the appended claims.

The invention claimed is:

1. A computer-implemented method for automatically deactivating the right or left turn signals of a vehicle at the end of a turn, the vehicle comprising at least four wheels, the method comprising:
   (a) determining with the computer, after the driver of the vehicle has manually activated the right or left turn signals by acting on a control device and as long as the right or left turn signals are on, the steering wheel angle with respect to a neutral position in which the two steered wheels of the vehicle are straight,
   (b) determining with the computer the average angle of the steered wheels in relation to their upright position from the steering wheel angle,
   (d) when the left turn signals are on, automatically deactivating, with the computer, the left turn signals when the average wheels angle exceeds, in relative value, a first positive threshold and then, still in relative value, falls below a second positive threshold,
   (e) failing this, keeping the left turn signals on,
   (f) when the right turn signals are on, automatically deactivating, with the computer, the right turn signals when the average wheels angle falls below, in relative value, a first negative threshold and then, still in relative value, exceeds a second negative threshold,
   (g) failing this, keeping the right turn signals on.

2. The method according to claim 1, wherein, in step (b), the average wheels angle is extrapolated from a model previously established from several average wheels angle calculations for several specific steering wheel angles.

3. The method according to claim 1, comprising an additional step of storing in memory and updating, throughout the period during which the left or right turn signals are activated, the maximum angle and the minimum angle, in relative values, of the steered wheels with respect to their right position.

4. A method according to claim 3, wherein, when the turn signals activated at step (a) are the right turn signals, the second negative threshold corresponds to a certain percentage of the minimum angle stored in memory and when the turn signals activated at step (a) are the left turn signals, the second positive threshold corresponds to a certain percentage of the maximum angle stored in memory.

5. A method according to claim 4, wherein said percentage automatically varies according to the speed of the vehicle.

6. A method according to claim 4, wherein said percentage is different depending on whether the vehicle is moving forward or backward.

7. A method according to claim 1, wherein the first positive threshold and/or the first negative threshold is set automatically according to the speed of the vehicle.

8. A method according to claim 7, wherein the first positive threshold and/or the first negative threshold is different depending on whether the vehicle is travelling at a speed above a certain limit, for example 60 km/h, or below this limit.

9. A method according to claim 1, wherein the first positive threshold and/or the first negative threshold is different depending on whether the vehicle is moving forward or backward.

10. A method according to claim 1, wherein the first positive threshold and the first negative threshold are identical in absolute value.

11. A method according to claim 1, wherein the turn signals are physically switched off at a later time than the end of step (d) or (f).

12. A non-transitory computer readable medium storing computer program comprising program code, when executed by a computer, for performing:
 (a) determining, after the driver of the vehicle has manually activated the right or left turn signals by acting on a control device and as long as the right or left turn signals are on, the steering wheel angle with respect to a neutral position in which the two steered wheels of the vehicle are straight,
 (b) determining the average angle of the steered wheels in relation to their upright position from the steering wheel angle,
 (d) when the left turn signals are on, automatically deactivating the left turn signals when the average wheels angle exceeds, in relative value, a first positive threshold and then, still in relative value, falls below a second positive threshold,
 (e) failing this, keeping the left turn signals on,
 (f) when the right turn signals are on, automatically deactivating the right turn signals when the average wheels angle falls below, in relative value, a first negative threshold and then, still in relative value, exceeds a second negative threshold,
 (g) failing this, keeping the right turn signals on.

13. A control unit (ECU) for controlling the automatic deactivation of the left and right turn signals of a vehicle at the end of a turn, the control unit being configured to perform:
 (a) determining, after the driver of the vehicle has manually activated the right or left turn signals by acting on a control device and as long as the right or left turn signals are on, the steering wheel angle with respect to a neutral position in which the two steered wheels of the vehicle are straight,
 (b) determining the average angle of the steered wheels in relation to their upright position from the steering wheel angle,
 (d) when the left turn signals are on, automatically deactivating the left turn signals when the average wheels angle exceeds, in relative value, a first positive threshold and then, still in relative value, falls below a second positive threshold,
 (e) failing this, keeping the left turn signals on,
 (f) when the right turn signals are on, automatically deactivating the right turn signals when the average wheels angle falls below, in relative value, a first negative threshold and then, still in relative value, exceeds a second negative threshold,
 (g) failing this, keeping the right turn signals on.

14. A vehicle comprising at least four wheels and a control unit for controlling the automatic deactivation of the left and right turn signals of a vehicle at the end of a turn, the control unit being configured to perform:
 (a) determining, after the driver of the vehicle has manually activated the right or left turn signals by acting on a control device and as long as the right or left turn signals are on, the steering wheel angle with respect to a neutral position in which the two steered wheels of the vehicle are straight,
 (b) determining the average angle of the steered wheels in relation to their upright position from the steering wheel angle,
 (d) when the left turn signals are on, automatically deactivating the left turn signals when the average wheels angle exceeds, in relative value, a first positive threshold and then, still in relative value, falls below a second positive threshold,
 (e) failing this, keeping the left turn signals on,
 (f) when the right turn signals are on, automatically deactivating the right turn signals when the average wheels angle falls below, in relative value, a first negative threshold and then, still in relative value, exceeds a second negative threshold,
 (g) failing this, keeping the right turn signals on.

15. The vehicle according to claim 14, comprising a device for manually controlling the left and right turn signals of the vehicle, wherein the device is movable in at least two directions, respectively to indicate a right or left turn, and is recalled to a neutral position when released by the driver.

16. The vehicle according to claim 15, wherein the vehicle's left or right turn signals are activated differently according to the length of the travel performed by the control device in either of the two directions from the neutral position.

17. The vehicle according to claim 15, wherein the left or right turn signals are temporarily activated when the device is moved to a first position and therefore automatically switched off after a certain period of time has elapsed from the time the device reaches the first position and wherein the left or right turn signals are permanently activated when the device is moved to a second position that is further away from the neutral position than the first position.

18. The vehicle according to claim 14, further comprising a rotation sensor for measuring the rotation of the steering wheel.

\* \* \* \* \*